United States Patent [19]

Yamamoto

[11] Patent Number: 5,647,890
[45] Date of Patent: Jul. 15, 1997

[54] FILTER APPARATUS WITH INDUCED VOLTAGE ELECTRODE AND METHOD

[76] Inventor: Yujiro Yamamoto, 1201 Via LaJolla, San Clemente, Calif. 92672

[21] Appl. No.: 686,332

[22] Filed: Jul. 25, 1996

Related U.S. Application Data

[63] Continuation-in-part of Ser. No. 342,923, Nov. 21, 1994, Pat. No. 5,540,761, which is a continuation-in-part of Ser. No. 230,474, Apr. 20, 1994, Pat. No. 5,368,635, which is a continuation of Ser. No. 17,300, Feb. 12, 1993, abandoned, which is a continuation of Ser. No. 805,066, Dec. 11, 1991, abandoned.

[51] Int. Cl.[6] ................................................. B03C 3/155
[52] U.S. Cl. ........................... 95/69; 95/70; 95/78; 96/57; 96/58; 96/59; 96/68
[58] Field of Search ............................... 96/17, 63, 57–59, 96/65–70, 99; 55/279, 528, 529; 95/69, 70, 78; 110/216, 217, 345; 422/4, 5, 120

[56] References Cited

U.S. PATENT DOCUMENTS

| | | | |
|---|---|---|---|
| 895,729 | 8/1908 | Cottrell | 95/73 |
| 2,116,509 | 5/1938 | Cottrell | 204/181.9 |
| 2,579,440 | 12/1951 | Palmer | 96/40 |
| 2,593,377 | 4/1952 | Wintermute | 95/70 |
| 2,634,818 | 4/1953 | Wintermute | 96/36 |
| 3,028,864 | 4/1962 | Minto | 131/333 |
| 3,237,387 | 3/1966 | Haugen et al. | 55/519 X |
| 3,392,509 | 7/1968 | Pelosi, Jr. | 96/66 |
| 3,537,238 | 11/1970 | Dungler | 55/462 X |
| 3,945,813 | 3/1976 | Iinoya et al. | 96/29 |
| 4,098,591 | 7/1978 | van Diepenbrook et al. | 95/57 |
| 4,205,969 | 6/1980 | Matsumoto | 96/66 |
| 4,244,710 | 1/1981 | Burger | 55/279 X |
| 4,244,712 | 1/1981 | Tongret | 55/279 X |
| 4,313,740 | 2/1982 | Kalishman | 55/527 X |
| 4,313,741 | 2/1982 | Masuda et al. | 96/78 |
| 4,321,066 | 3/1982 | Masuda | 96/40 |
| 4,405,342 | 9/1983 | Bergman | 55/354 X |
| 4,541,847 | 9/1985 | Oie et al. | 55/279 X |
| 4,549,887 | 10/1985 | Joannou | 55/493 X |
| 4,581,046 | 4/1986 | Bergman | 55/484 X |
| 4,623,365 | 11/1986 | Bergman | 55/498 X |
| 4,654,054 | 3/1987 | Snaddon et al. | 96/68 |
| 4,662,903 | 5/1987 | Yanagawa | 96/59 |
| 4,702,752 | 10/1987 | Yanagawa | 55/529 X |
| 4,715,870 | 12/1987 | Masuda et al. | 96/67 |
| 4,737,169 | 4/1988 | Bossard | 96/58 |
| 4,759,778 | 7/1988 | Conrad | 96/59 |
| 4,938,786 | 7/1990 | Tonomoto | 55/528 X |
| 4,978,372 | 12/1990 | Pick | 96/67 |
| 5,024,681 | 6/1991 | Chang | 110/217 X |
| 5,108,470 | 4/1992 | Pick | 96/58 |
| 5,330,559 | 7/1994 | Cheney et al. | 95/63 |
| 5,368,635 | 11/1994 | Yamamoto | 96/17 |
| 5,403,383 | 4/1995 | Jaisinghani | 95/69 |
| 5,540,761 | 7/1996 | Yamamoto | 96/67 |

FOREIGN PATENT DOCUMENTS

WO9105611  5/1991  WIPO.

OTHER PUBLICATIONS

Kanagawa Industrial Tech Development, Japanese Newspaper, Oct. 1989.
Nikkei Mechanical Japanese Publication, p. 81, Oct. 1989.

Primary Examiner—Richard L. Chiesa
Attorney, Agent, or Firm—Walter A. Hackler

[57] ABSTRACT

A clog-resistant filter and method for extracting fine particulate contaminants, such as smoke, from a gaseous fluid stream, such as air, uses an induced voltage electrode to efficiently capture the contaminant particles in a filter material whose pores are many times larger than the diameter of the particles to be captured. The filter material is physically so configured to further enhance that interaction and is disposed between at least a pair of electrodes of opposite polarity.

19 Claims, 10 Drawing Sheets

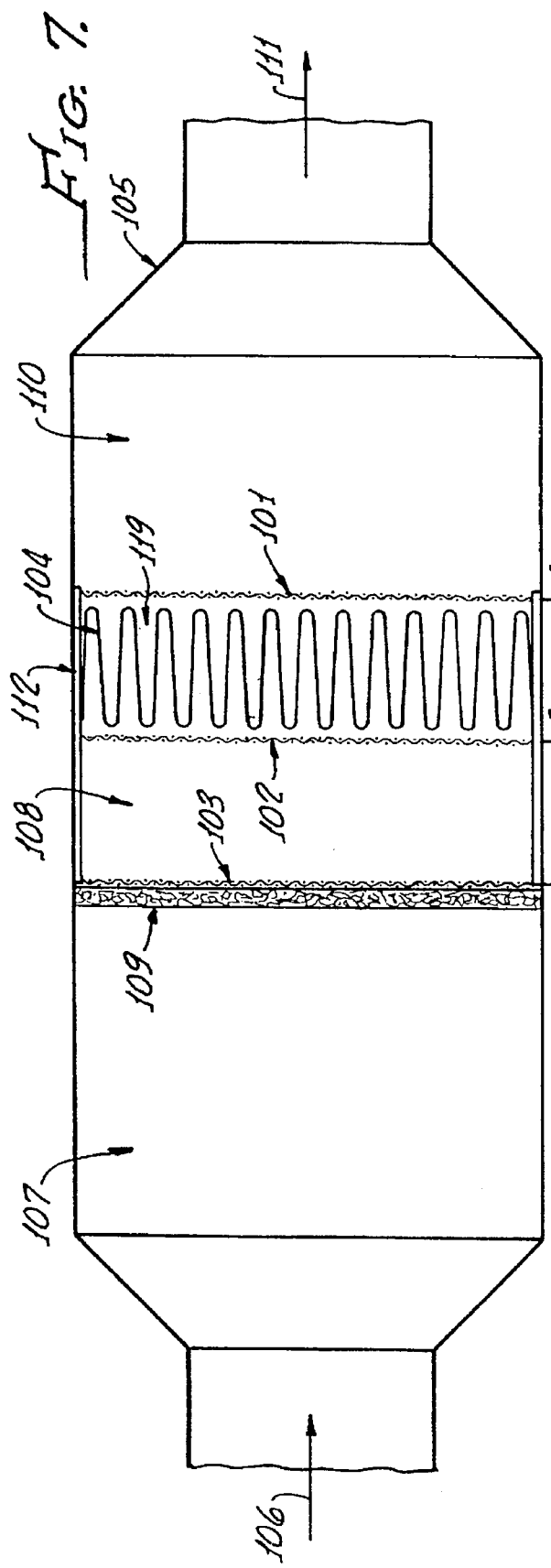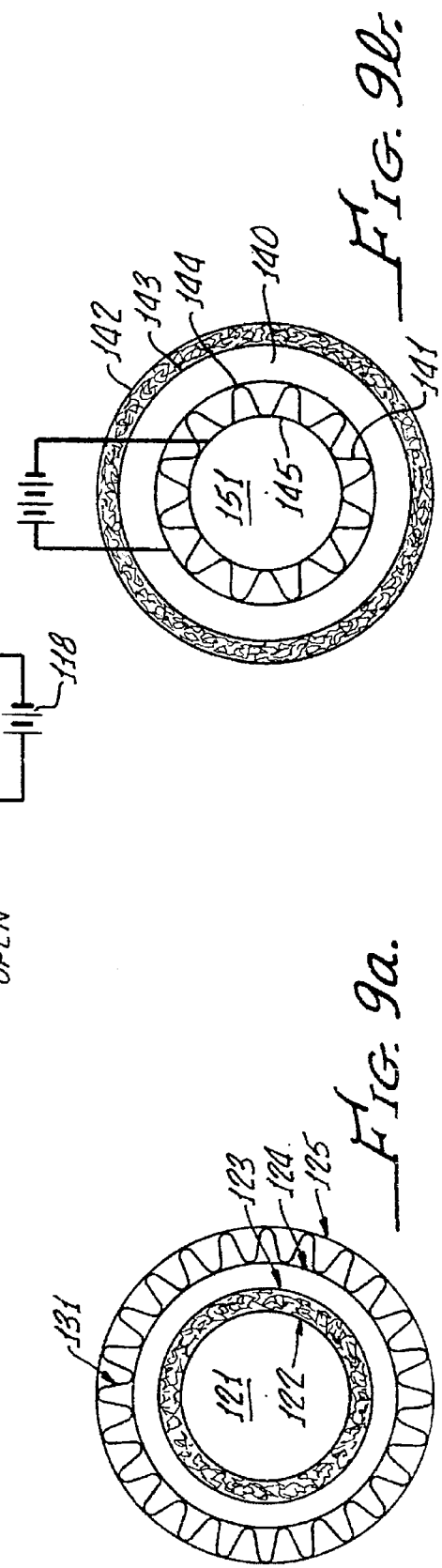

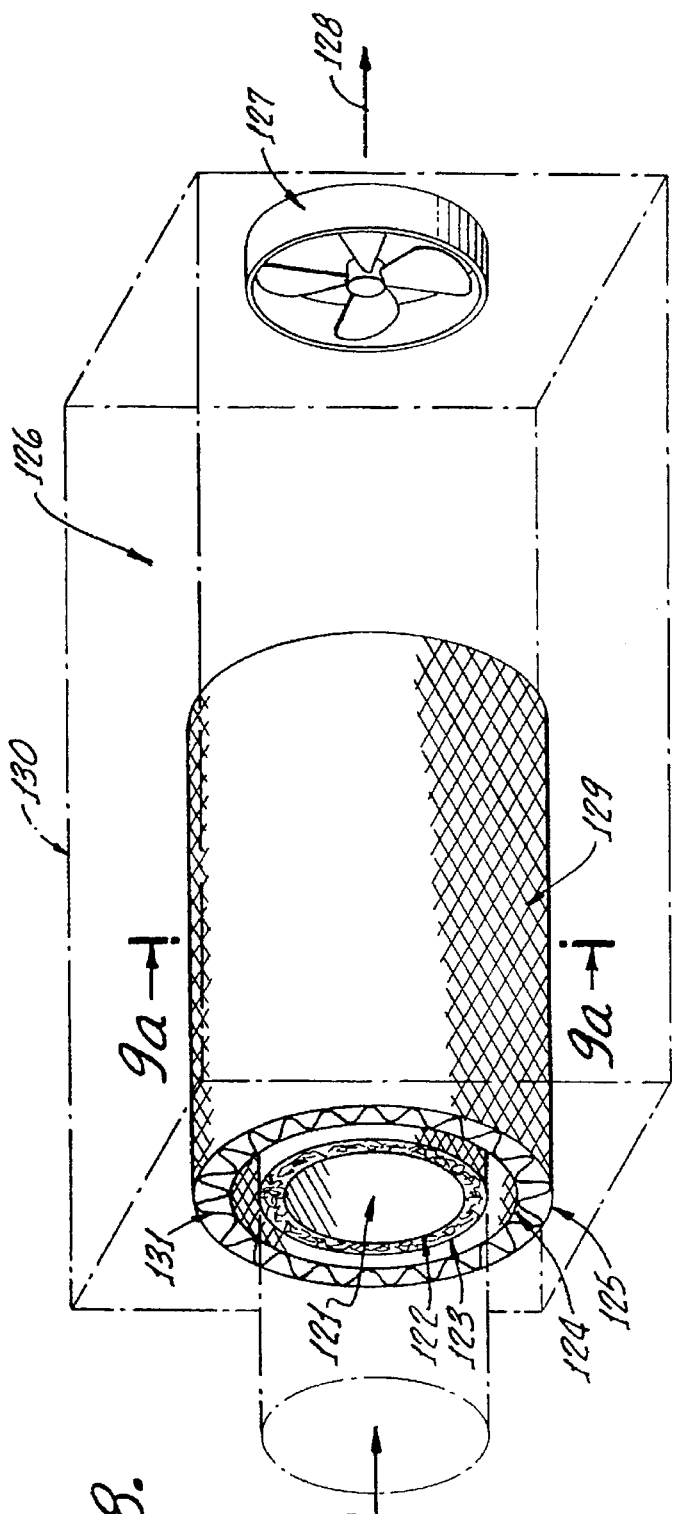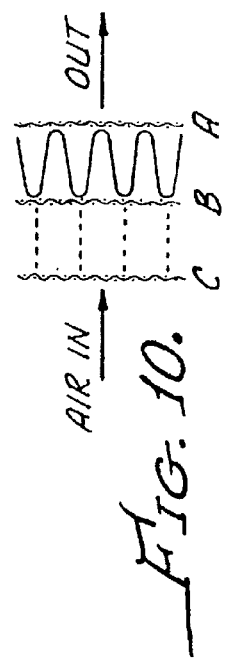

FILTER APPARATUS WITH INDUCED VOLTAGE ELECTRODE AND METHOD

This application is a continuation-in-part of U.S. Ser. No. 08/342,923 filed on Nov. 21, 1994 now U.S. Pat. No. 5,540,761 which is a continuation-in-part of U.S. Ser. No. 08/230,474 filed Apr. 20, 1994, now U.S. Pat. No. 5,368,635 which is a continuation of U.S. Ser. No. 08/017,300 filed Feb. 12, 1993, now abandoned, which is a continuation of U.S. Ser. No. 07/805,066 filed Dec. 11, 1991 now abandoned.

FIELD OF THE INVENTION

This invention relates to filters for removing small particulate materials from a gaseous fluid such as air, and more specifically to a filter, having low pressure drop, long life, low energy cost and high reliability, which meets the needs of modern air purification. The filters in accordance with the present invention utilize an induced voltage electrode to achieve these advantages.

BACKGROUND OF THE INVENTION

Heretofore, the major purpose of air filtration was to reduce the density of dust, consisting mostly of 0.2 micron, or larger, particles from air. Recent environmental concerns in the living, industrial and military environs have expanded the desired scope of air filtration into the "suppression of odor and virus/gems." Yet current air purification methods are hindered in many ways by an inability to capture undesirable submicron particles, microorganisms, odors, and substances efficiently and economically without suffering from high pressure drop, short life, energy inefficiency, and poor reliability. Simply stated, there is no current adequate method to meet the needs of modern air purification.

There have been thousands of experiments, research efforts, and patents made in the field of air filtration. However, all of this work has followed three existing basic principles: (1) the mechanical filter (mechanical blocking of airborne particles by mesh) (a few hundred years old—but sill the most common and widely used method); (2) the electrostatic precipitator (invented 90 years ago in 1906 by Cottrell, which relies on ionization and the Coulomb's law attraction of particle separation for filtration); and (3) the precharged synthetic fiber filter (precharged fibers create an electrostatic field within the filter material and interact with and capture airborne particles).

A summary of these three known principles, or methods, is presented below:

In the mechanical filtration method, substantial improvements took place, such as the utilization of cellulose material, synthetic fibers (HEPA & ULPA filters), etc.; but the basic form is still the mechanical blocking of particles. This method has been adequate for the filtration of particles larger than 0.2 microns. However, filtration of submicron particles (odor, virus, etc.) through porous material (less than 0.05 microns) creates a tremendous amount of pressure drop, energy inefficiency, and high cost of operation, and therefore is not practical. Currently, such needs are supplemented by additional costly devices, e.g. activated charcoal deodorizers, and the like.

Many types of electrostatic filters have been proposed for removing small particulate materials such as dust, smoke, viruses, and the like from gases such as air or the exhaust gases of vehicles or industrial processes. Typically, such filters rely in one way or another on the ionization of the particulate material by a fixed high voltage electric field, so that they may be trapped and held by electrostatic forces. Common disadvantages of ionizing electrostatic filters are that they operate at sufficiently high voltages, requiring expensive insulation and safety precautions, as well as substantial electric power, and that they produce ozone, which constitutes a health hazard.

There are a number of additional problems with known electrostatic filter technologies, whereby the attraction and collection of particulates to the filter materials are accomplished by Coulomb's Law, including flocculating effects, creating unpredictable occasional bursts of release of dust, inadequate dust-holding capacity, requiring more frequent maintenance, and other common disadvantages associated with high voltage utilization. Thus, electrostatic filtration is used today mainly as a pre-filter or general purpose filter for commercial purposes, without requiring realistic high performance.

Starting in the 1970's, precharged synthetic material fibers were introduced. Typically, a square or rectangular cross section synthetic fiber is utilized to retain electrostatic charge within the filter material. This is a hybrid of the mechanical and electrostatic filtration methods. The main problem is internal discharge in a relatively short time, resulting in degradation of the filtration capability.

Turning now to a history of the present invention, in 1991, Y. Yamamoto discovered a new method whereby a properly set non-ionizing electrical field could create a random, high speed, and churning motion of airborne particles in perpendicular directions to the air flow through a filter medium placed in the electric field, see U.S. Pat. No. 5,368,635. The said churning motion inside of a filter medium dramatically increases the probability of particles to bombard the surfaces of the fibers which compose the filter medium. Thus, a combination of such motion and Van der Waals force interaction between particles and fiber surfaces tremendously increases the probability of capturing particles throughout the filter material. This method efficiently captures a wide range of particles, in fact, even submicron particles which are much, much smaller than the porosity of the filter medium used.

This invention simply but dramatically upgrades the efficiency of filtration of most of the filter media known today, including paper, glass fiber, synthetic fiber, cloth, natural fiber, foam and electrostatically charged materials. This method provides the advantages of 1) high efficiency of filtration, 2) capturing particles in a wide range of sizes, including below submicron sizes, 3) the least amount of pressure drop, 4) improvement in energy efficiency, and 5) low cost. These advantages are achieved without any change in the mechanical properties of the filter.

SUMMARY OF THE INVENTION

Filter apparatus for providing efficient trapping of particles suspended in a gaseous fluid stream generally includes a filter chamber which provides means for defining an air flow path between an inlet and outlet and a porous filter material disposed and positioned in the flow path comprising a material having a pore size substantially larger than the average diameter of the particles to be trapped. Further, the filter material includes a collection surface thereon substantially larger than a cross-section of the flow path, typically a pleated surface.

Means are provided for causing the gaseous fluid stream and particles suspended therein to flow along a flow path and through the porous filter.

First and second electrodes are disposed with the porous filter material therebetween which include openings therein to provide and enable air flow therethrough.

Importantly, a third electrode is provided, which produces a synergistic improvement in filtration efficiency. An electrical potential is applied between the first and second electrodes. The third electrode is not directly connected to another electrical power supply nor wired to the other two electrodes, but its electrical potential is induced through air path and/or leak path from nearby electrode. A second porous filter material is placed on or adjacent the third electrode. This arrangement produces substantially improved properties of air purification known today, and is capable of capturing a wide range of airborne particles, including submicron particles.

It should be appreciated that if the third electrode is provided with a positive potential, some improvement in filtration efficiency over a two electrode system may occur, however, such an arrangement does not provide the efficiency of a three electrode system with the third electrode floating, i.e. not connected to a power supply or other electrode.

The second filter material may be very coarse and may placed on the second electrode. However, as shown experimentally, the filter material is preferably disposed on or adjacent the third electrode.

The most preferred embodiment is to place the third electrode outside of the first or second electrode, whichever holds a positive potential (at the in-flow or out-flow ends of the filter assembly). Another alternative is to place the third electrode between the first and second electrodes.

This is based on the principle that a conductive surface near a charged conducting body through which no currents are flowing becomes an equipotential surface. This potential is maintained by equal positive and negative charges moving to parts of the conductor so that the potential at any point on the conductor due to all of the charges of the system is constant.

More particularly, filter apparatus in accordance with the present invention electrifies the third electrode with a voltage differential of at least 40 percent of the voltage applied on the closest electrode. Preferably, the third electrode is electrified with an induced voltage of above 60 percent of the voltage applied across the first and second electrodes in order to maximize the enhancement of filter efficiency.

In one embodiment of the present invention, the first, second and third electrodes are coaxially disposed. Further, the third electrode in this embodiment may either be disposed outwardly from the first and second electrodes or inwardly.

More specifically, the first and second electrodes may be spaced apart from each other a distance of about between about 5 mm and about 50 mm. With this spacing about 3,000 volts and about 10,000 volts may be applied across the first and second electrodes. With this configuration, the third electrode may be disposed about 13 mm from the first or second electrode, whichever carries the positive side of the potential applied.

A method in accordance with the present invention includes the steps of establishing a flow of gaseous fluid with particles suspended therein and passing the flow of gaseous fluid through the third (and adjacent porous filter material), second and first electrodes with a porous filter disposed between the first and second electrodes.

A voltage is applied across the first and second electrodes in order to cause churning of the particles within the porous filter and trapping the particles as the gaseous fluid passes through the porous filter. Finally, the first, second and third electrodes are arranged in order to electrify, by induction, the third electrode with a voltage in order to increase the efficiency of trapping of particles. More specifically, the method in accordance with the present invention includes arranging the electrodes in such a way as to cause an induced voltage in the third electrode at least 40 percent of the voltage applied across the first and second electrodes.

BRIEF DESCRIPTION OF THE DRAWINGS

The advantages and features of the present invention will be better understood by the following description when considered in conjunction with the accompanying drawings in which:

FIG. 1-a is another embodiment of the present invention similar to the configuration as FIG. 1, with an additional third electrode provided along with an additional coarse, porous filter material adjacent thereto;

FIG. 7 is a vertical section of yet another embodiment of the present invention—a planar filter in an air path chamber;

FIG. 8 shows a cylindrically formed filter with three-electrode configuration in a test chamber;

FIG. 9a shows the cylindrical inner structure of the three-electrode filter;

FIG. 9b shows a reversed structure for air flow of FIG. 9a.

FIG. 10 shows unifying the equipotential line over the tips of the pleated filter material by the mid-electrode;

DETAILED DESCRIPTION OF THE PREFERRED EMBODIMENTS

Figure 1:
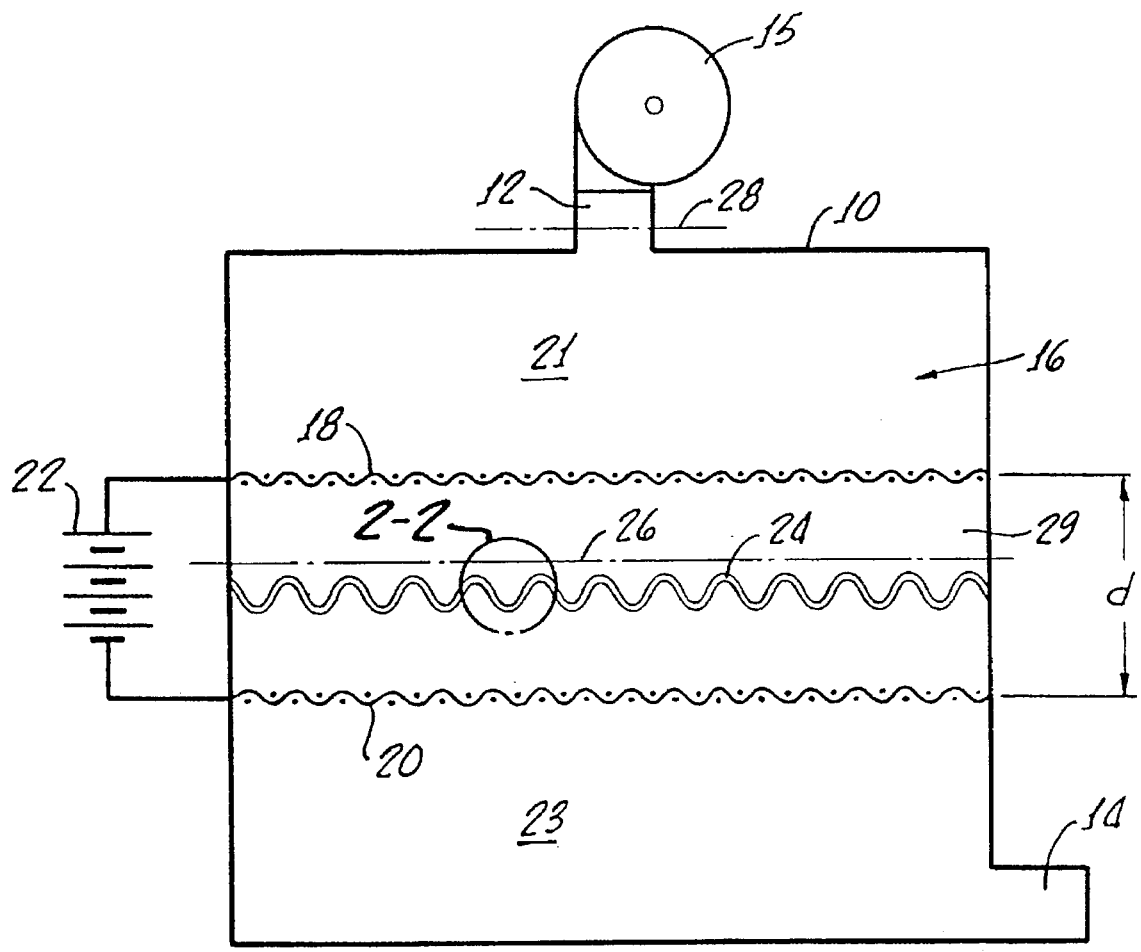
FIG. 1 is a vertical section of the original filter constructed in accordance with the present invention shown in U.S. Pat. No. 5,368,635.

Turning to FIG. 1, there is illustrated a filter constructed in accordance with the invention as set forth in U.S. Pat. No. 5,368,635. A filter housing 10 has an inlet pipe 12 at its top and an outlet pipe 14 at its bottom. A gaseous fluid,. such as air, contaminated with suspended particulate materials, e.g., dust or smoke, is conveyed through the flow path from inlet pipe 12 to outlet pipe 14 by appropriate impelling means schematically illustrated as a pump 15. The housing 10 encloses a filter chamber 16 in which apertured electrodes 18, 20 are disposed, transversely to the axis of the chamber 16, between an intake plenum 21 and outlet plenum 23.

The electrodes 18, 20 may consist of a metallic mesh or a perforated metallic plate, or they may be carbonized layers of a filter material; in either event, the openings in the electrodes 18, 20 are large enough not to significantly affect the air flow through the chamber 16.

One of the electrodes may be used as a filter. In this instance, the filter would include a conductive filter material or a non-conductive material with conductive particles or strands interspersed therein. The electrodes 18, 20 are connected to a direct current voltage source 22. The polarity of the electrodes 18, 20 does not greatly affect the operation of the invention in most instances.

Disposed between the electrodes 18, 20 is a porous filter material 24 of a shape discussed in more detail hereinafter. The material 24 is preferably a non-hygroscopic material forming a mesh. The filter material 24 is preferably dielectric or partially conductive. Many filter materials may be used. Examples of suitable materials include paper, foam, glass fiber, synthetic fiber, cloth, natural fibers such as cotton, or materials with a natural electrostatic charge such as 3M's FILTRETE® or Toray's TORI-MICRON® (Japan). An example of a suitable conductive material is a metal-impregnated fiber sheet developed by Toray Co. Ltd. and marketed under the name "SOLDION PAPER®" by Shiga Shokusan Inc. of Japan.

The average pore size of the filter is preferably about ten to fifty times the average diameter of the particles to be captured, but even particles as small as 1/500 average pore size can be captured to a significant degree if the flow velocity is slow enough. Depending upon the application, the material 24 may be as thick as 25 mm (in a uniform, varying density, or multilayered configuration) as compared to typical pleated filter material which is about 0.5 to 1 mm thick.

The ability to capture particles with much larger porosity enhances the holding capacity of the filter because particle capture occurs throughout the thickness of the material 24 and not just on the surface of the filter material. Stacked pleated filter materials—such as commonly used in HEPA, ULPA, and similar filters—are preferably used for simplicity in providing the area amplification needed for slowing the fluid flow rate per unit area as described below.

However, for optimum capture of the particles, it is preferable to use a layered arrangement of filter materials with varying porosity. Also, the polarity for most effective filtration is somewhat dependent upon the nature of the filtered particles, e.g., dielectric particles, such as dioctyl phthalate (upstream positive preferable) vs. partially conductive particles, such as cigarette smoke (downstream positive preferable). The electrodes 18, 20 may be coated with an insulating material to avoid shorting or extreme reduction of resistance between the electrodes 18, 20 by accumulation of particles in the filter material 24.

An air gap may be placed between the filter material 24 and the electrode 18 (positive electrical potential) or electrode 20 (ground). Such separation creates substantial economy in electric power consumption while the efficiency of the filter further increases. The overall electric power inquestion may not be considered large in normal usage; however, this consideration is very useful when electric power is very limited, such as in the case of portable, battery-operated product applications.

Figure 1A:
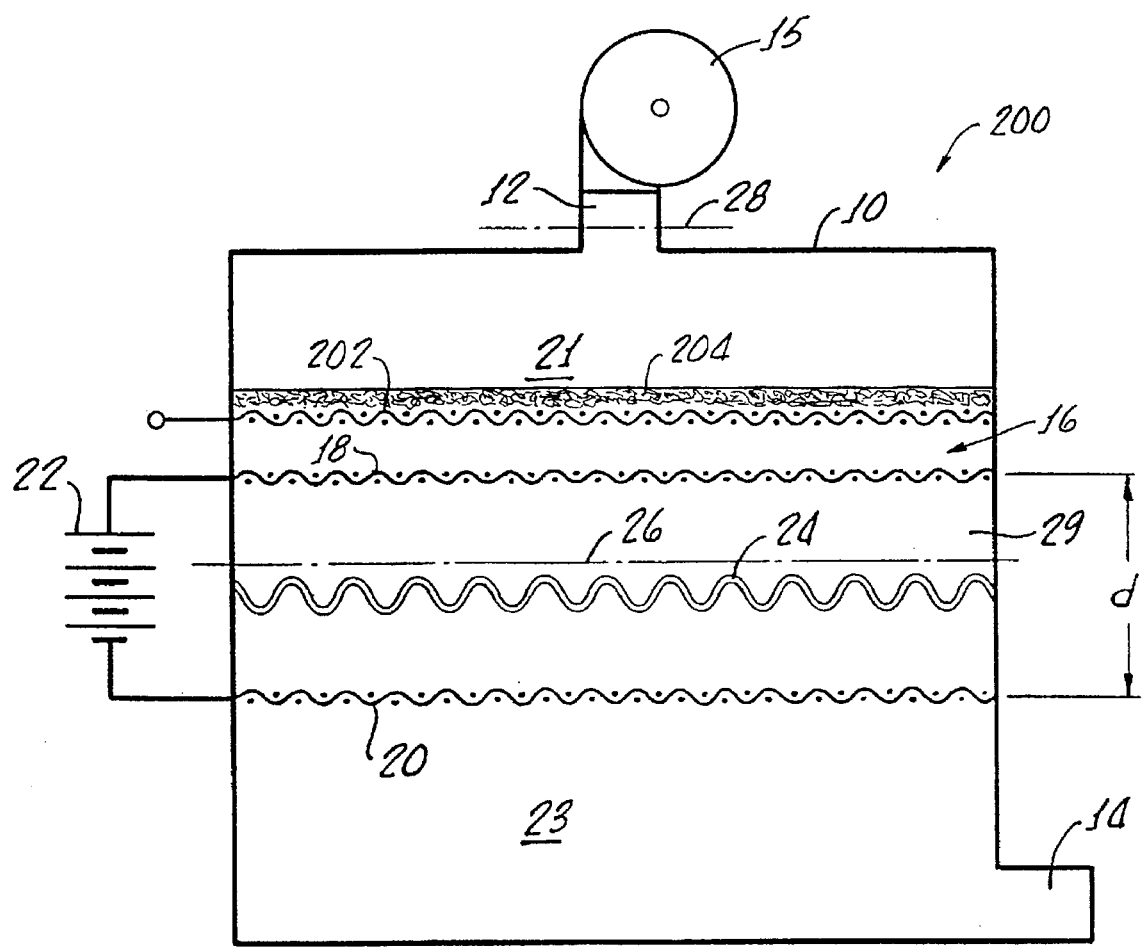

A further improved embodiment 200 of the present invention is shown in FIG. 1a. In this embodiment 200, a third electrode 202 is utilized in the structure hereinabove described and shown in FIG. 1, together with a second, preferably coarse, porous filter material 204 attached, or adjacent thereto. This embodiment 200 produces a synergistic and substantial improvement in particle capturing efficiency over the structure shown in FIG. 1 as will be hereinafter described in greater detail.

The added third electrode 202 is not wired directly to any power supply nor the other two electrodes 18, 20 but has induced potential by its proximity to the nearest electrode 18 or 20. It should be appreciated that like reference numerals or characters in the Figures refer to identical or corresponding parts.

The present invention provides a simple, highly efficient, energy-saving electrostatic particle filter, which operates at substantially lower voltages and negligible power consumption in comparison with conventional electrostatic precipitators and uses an interaction between natural Van der Waals forces and a nonionizing electrical field to create a churning motion of airborne particles, to increase the residence time of particles, and to increase the probability of trapping airborne particulates in the filter materials. This arrangement makes it possible to capture particles of widely varying sizes more efficiently with less chance of clogging and without the formation of ozone. This arrangement also allows the porosity of the filter material to be considerably larger than the size of the particulates to be captured without a reduction in effectiveness. This results in a much lower air pressure drop across the filter.

Van der Waals forces are molecular electrostatic fields which are inherently associated with foreign particles suspended in fluid and gases, such as air. A common manifestation of these forces is the attraction of dust particles to plastic or other surfaces. Once the particles make contact with the surfaces, the Van der Waals force increases dramatically and makes the particles adhere to the surface.

The particles are not easily removable because the Van der Waals force is proportional to $1/a^6$, where "a" is the effective distance of the particles from the surface. Thus, this force provides a strong bond once contact is established. At any significant distance from the surface, the Van der Waals force is a very small force (defined by Van Nostrand's Encyclopedia of Science as interatomic or intermolecular forces of attraction), and does not come into play in conventional electrostatic precipitators which mostly rely on the direct attraction between charged particles and collecting surface with high potential by Coulomb's law $1/a^2$ and because the flow rate is too high to allow any significant particle capture by the Van der Waals force.

The filter of the present invention accomplishes its objectives by using a filter geometric configuration which slows the flow of the air or other gaseous fluid through the filter material to the point where the particles suspended in the fluid can be captured and held in the filter materials, essentially by the Van der Waals force. Furthermore, while the flow of the air through the filter material longitudinally of the air flow path is slowed by a specific geometry, the active, generally transverse motion of the particles between the electrodes substantially increases the chance that the particles will make contact with the filter materials.

Consequently, the filter materials capture particles much smaller than its pore size, and this minimizes pressure drop, increases the dust-holding capacity, and minimizes clogging of the filter. By the same token, as the pore size is much larger than the particles, the thickness of the filter materials can be substantially increased in comparison to filter materials in conventional filters. The increased thickness of the filter materials thus further contributes to much more effective filtration. In the filter of the present invention, the electrostatic field is used only to enhance the action of the Van der Waals force and to impart to the particles the generally transverse motion which facilitates their capture.

Within limits, the operation of the filter of the present invention is dependent only upon the absolute voltage difference across the filter material 24, and influence of the voltage induced on the third electrode 202, not upon the volts/cm field strength of conventional electrostatic filters. Consequently, the thickness of the filter materials can be varied to accommodate different environments without changing the electrical components.

In accordance with another aspect of the invention, the action of the Van der Waals force can be substantially enhanced by causing one of the electrodes 18 to 20 to touch the filter materials and the other electrode 18 to 20 to have an air gap between it and the filter material 24, or by interweaving or embedding conductive fibers in the filter material 24.

The filter material 24, 204 can be conductive or imbedded with the conductive fibers. The embedded conductive fibers can consist of chopped microscopic substances (both isolated or non-isolated) which create a vast number of air gaps between the tips of conductive fibers that produce microscopic but strong electric fields in the air gaps and throughout the filter materials. However, although materials of this type are generally designed for applications involving the release of static electricity by internal arcing between the fibers of the materials. In any event, arcing should be prevented. This results in further enhancement of the particle attraction by the Van der Waals force, and therefore more efficient filtration.

Similarly, when the filter materials include or are treated or coated with an active substance, such as, for example, activated charcoal, which chemically reacts with and absorbs the undesirable substance (e.g., odors, hazardous particles, poisonous gas, microorganisms) in air, the churning motion of particles created by the electrostatic field within the filter materials accelerates the chemical reaction and absorption and destruction of the undesirable substances (such as viruses, bacteria, etc.) in the filter materials. Similarly, the effectiveness of the activated charcoal for odor absorption is enhanced by the electric fields by the present invention.

Figure 2:
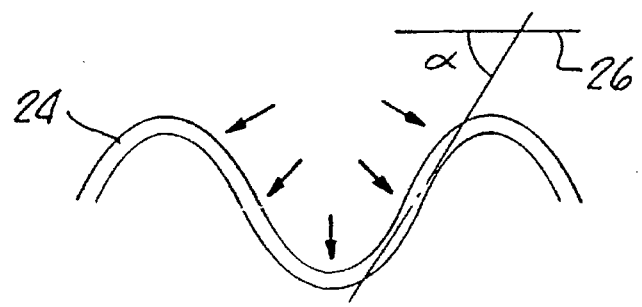
FIG. 2 is a detail section along line 2—2 of FIGS. 1 and 1-a.
Figure 6:
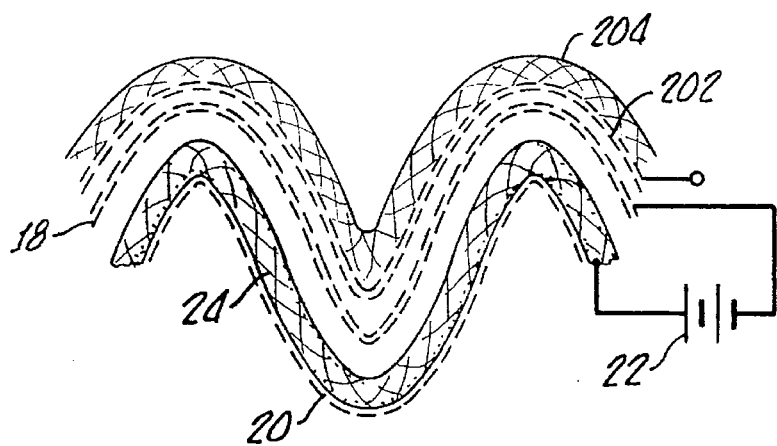
FIG. 6 is a detail section of an alternative electrode design.

In order for the filter of this invention to effectively utilize the Van der Waals force associated with the particles to be captured, the flow velocity of the gaseous fluid should be as low as one's design criteria allows, e.g. less than 0.1 m/sec. For example, if the material 24 is folded, as shown in FIG. 2, the surface area of material 24 on the inlet side or the outlet side is i/cos α m/sec. If α is 45°, the maximum flow velocity at plane 26 is 0.14 m/sec. The electrodes 18, 20 and 202 may be shaped to follow the undulations of the filter material surface, as illustrated in FIG. 6.

The slow flow velocity of the particles in the direction of flow importantly causes the particles to remain in the filter materials 24 and 204 long enough to be captured. The electrostatic field imparts a turbulent motion to the particles which greatly enhances the chances, during their passage through the filter materials 24 and 204, of being captured by the Van der Waals force. For this reason, it is preferable for the filter materials 24, 204 in the inventive filter to be thick (e.g., 2–3 mm) in the direction of flow, contrary to conventional filters (thickness 0.5–1 mm) in which most of the particle capture occurs at the materials' upstream surface.

In accordance with the present invention the DC potential difference between the electrodes 18, 20 should be at least 3 kV but not more than 10 kV, and preferably in the range of 3–9 kV, with the optimum being about 7 kV. The induced electrical potential on electrode 202 is also in the range of 3–9 kV, preferably 6–9 kV. The precise voltage selection is dependent upon the particulate material of interest, the porosity of the filter, the type of filter material used, and the velocity of the air stream through the filter.

Above 10 kV, filtration continues to improve. However, improvement is due to a partially induced ionization of the particles, which begins to occur in localized areas at about 11 kV and above, and the demand of electric current increases quite rapidly. The problem with this is that when the filter itself thus generates ionized particles, some of those particles are entrained by the air stream and attach themselves to walls and ducts downstream of the filter. In those positions, the particles become contaminants with an unpredictable timing of release into the air—an undesirable situation for a clean room atmosphere, for example. In summary, too high a voltage wastes energy and presents a danger of ozone production; without significantly improving filter performance; too low a voltage degrades the performance of the filter.

The distance d between the electrodes 18, 20 and 204, can vary at any given voltage. As a practical matter, the distances are preferably kept in the range of about 13 mm for effective filtration. Too small a distance creates a danger of arcing; too great a distance degrades the performance of the filter. The voltage level affects the size of particles that can be captured, as well as the depth of their penetration into the filter materials 24 and 202.

The properties of the filter of the present invention are illustrated by the following examples.

EXAMPLE I

In reference to FIG. 1, a pair of electrodes 18, 20, having a mesh-like structure with apertures having an average opening of about 1 mm square, were disposed in a plastic housing 10 with an inside diameter of about 7.5 cm at a distance of about 25 mm from each other. A layer 24 of flat paper fiber material about 2 mm thick, having an average pore size of about 10 microns, was placed between the electrodes 18, 20, parallel thereto, coextensive therewith, and spaced therefrom, in the chamber 16 formed by housing 10. Air contaminated with cigarette smoke having a particle size range from about 0.01 microns to 1 micron was drawn through the chamber 16 at a rate producing a flow velocity of about 0.01 m/sec through the inlet pipe 12; thus, the flow velocity at the electrodes and filter material was much slower. As the voltage of DC voltage source 22 was varied (with the positive electrode on the downstream side— although the polarity was found to be essentially immaterial), the following was observed:

When the potential was above 10 kV, the smoke particles failed (refused) to penetrate through the electrode 18 and accumulated in the intake plenum 21. The discovery was a rapidly churning cloud of smoke particles formed at this potential above the first electrode 18. This churning motion is mostly perpendicular to the direction of air flow. It was noted that observable individual particles were moving quite rapidly within this cloud. However, when the potential was incrementally lowered from 9 kV to 3 kV without the filter material 24 in place, the layer of cloud-like smoke particles penetrated into the space 29. As the voltage was lowered, the layer lowered itself closer to the second electrode 20. The perpendicular and extremely fast-moving churning motion of particles continued. However, the smoke particles stayed in the space 29 without penetrating through the lower electrode 20. When the experiment was conducted with the filter material 24 in place, essentially all of the smoke particles adhered throughout the material 24 (coating fiber surfaces all around, not just the inflow side), with the potential ranging between 9 kV and 3 kV. Below 2 kV and without the material 24, there was no longer a layer of cloud observed, and the smoke went through both electrodes and exited to 14 through 23. With a filter material, the potential below 2 kV, little or no additional filtering action occurred beyond normal filtering action of the material.

When the voltage is removed or further lowered from the experimental voltage (9 kV–3 kV) to 0 V, adhered particles did not become dislodged from the material 24.

As the air velocity was increased beyond 0.1 m/sec, the air flow force pushed the particles through the first electrode 18, filter material 24, and second electrode 20; thus, the above-described phenomenon was not readily observed, and filtration capability deteriorated significantly. However, with the electrical potential applied (9 kV to 3 kV), the filtration efficiency was always substantially better than that of the filter material by itself (e.g. paper, foam, synthetic fibers, precharged fibers, etc.).

EXAMPLE II

Figure 3:
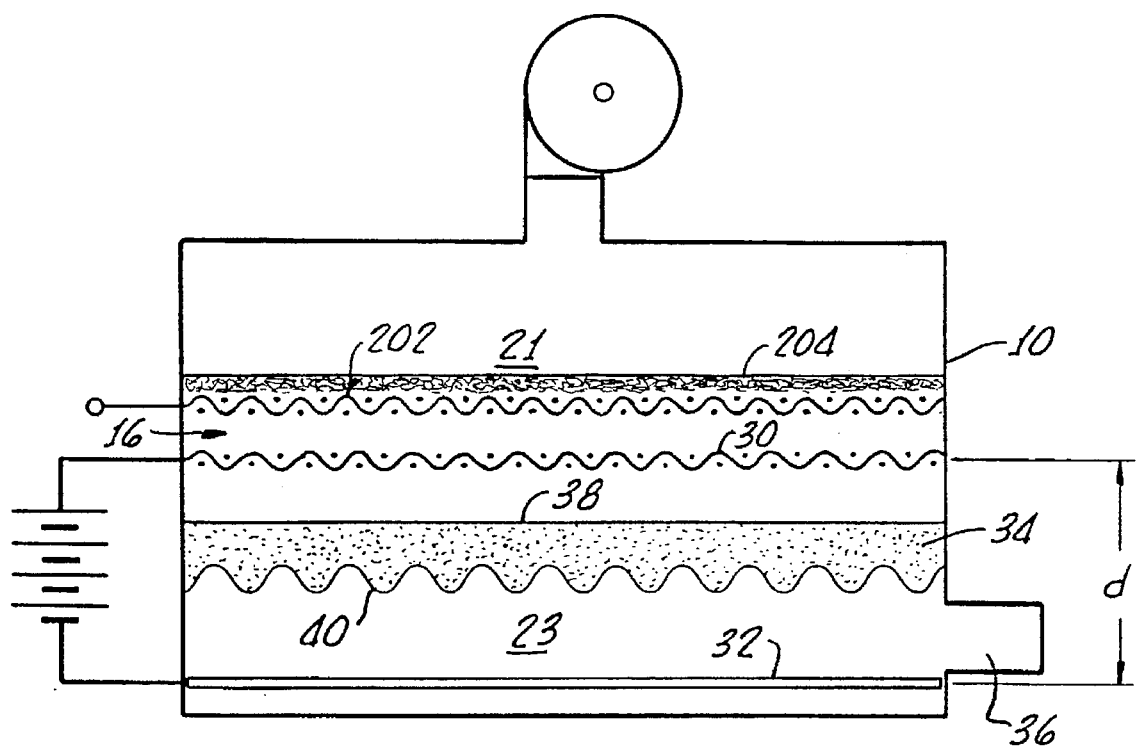
FIG. 3 is a vertical cross section of an alternative embodiment of the present invention.

In an alternative embodiment of the invention, FIG. 3 illustrates two points:

(1) that the air flow does not have to be drawn through both electrodes, and (2) that the filter material does not have to be of uniform thickness.

In FIG. 3, a set of electrodes 30, 32, 202 (with a coarse, porous filter material 204) in chamber 16 have a filter material 34 disposed between electrodes 30 and 32. Although the electrodes 30, 32 and 202 may all be apertured like the electrodes 18, 20 and 202 of FIG. 1a, the electrode 32 may be solid in the embodiment shown in FIG. 3 because the air stream exits through outlet 36.

A solid electrode 32 produces a slightly more uniform field in the material 34 than does a mesh electrode. In either event, however, the electrodes 30, 32 and 202 (as well as the electrodes 18, 20) should be substantially smooth and devoid of sharp bends because major surface discontinuities in the electrodes tend to concentrate the electrified in a non-uniform pattern.

The filter material 34 in the embodiment illustrated in FIG. 3 is shown as a porous, egg crate-shaped filter material. Although the entry velocity of the air into material 34 along surface 38 at the maximum flow rate (using the flow rates and size parameters of Example I above), would be well above 0.1 m/sec, the internal geometry of the material 34 spreads the air flow so that its velocity at the exit from material 34 along the much larger surface 40 is well below the 0.1 m/sec mark.

Very large particles tend to be mechanically trapped near the surface 38, while the entrapment of smaller particles tend to be distributed through the material 34 with maximum trapping occurring near the surface 40. This action may be enhanced by having a variable density (or a multi-layer structure) for filter material 34. Namely the porosity of the material near inflow surface 38 is coarse and finer towards outflow surface 40. This structure of filter material 34 is useful to: (1) reduce clogging, (2) capture a wider size range of particles, and (3) increase the particle-holding capacity of the filter material (see details in Example VI).

The multi-layer construction described hereinabove may be integrated into the embodiment 200 of the present invention not only for widening the range of particles sizes to be captured, but also to cause the filter to respond to the more modern requirements of today's society, such as odor and virus suppression and, eventually killing of microorganisms.

EXAMPLE III

Figure 4:
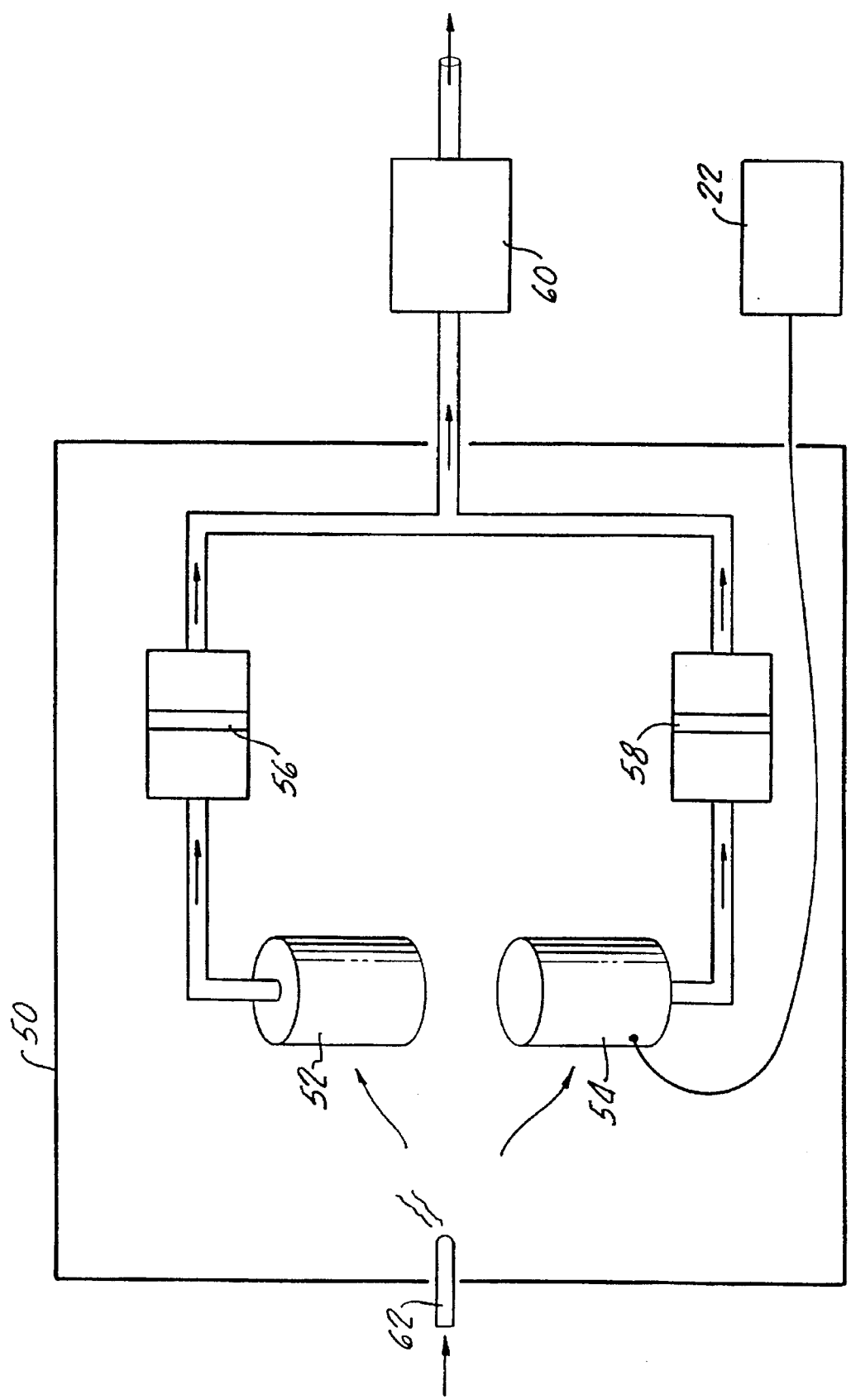
FIG. 4 is a block diagram of an apparatus for testing the invention with and without the Vander Waals enhancement.

An experimental filter apparatus for testing the invention was constructed as shown in FIG. 4, using a chamber 50 having a size of 50 cm×31 cm×26 cm. Two identical cylindrical air filters 52, 54 were placed side-by-side in the chamber 50. Each air filter contained a pleated filter material, which was sandwiched between two electrodes spaced 12 mm apart, and formed into a cylindrical structure. For the experiment, the bottom of each air filter was closed, and the top was connected to a monitoring membrane 56, 58 which collected the residual smoke particles that had penetrated through the air filter 52 or 54, respectively. The air output was sucked out by a vacuum pump 60 through the membranes 56, 58. The porosity of the air filter material was about 32 microns. Smoke particles from 0.01 to 1 micron in size were drawn from a cigarette. Air was drawn through a burning cigarette 62 (creating smoke) and introduced into the chamber at about 1 cfm (472 cubic cms/sec) rate. The smoke was then separately drawn through the walls of the two identical air filters at an equal rate and exhausted up and out of the center of the cylinders through the membranes 56, 58 and out of the chamber.

A voltage of 7 kV was applied across the electrodes of air filter 54. No voltage was applied to air filter 52. The membrane 56 downstream of the air filter 52 displayed a deposit of dark brown material (accumulation of smoke particles). The membrane 58 downstream of air filter 54 showed almost no deposit of particles—almost all particles having been absorbed in the filter material between the electrodes of filter 54.

The efficiency ration determined by observing the relative discoloration of the membranes 56, 58 was estimated to be better than 1,000 to 1. When the apparatus was new and clean, and only the air path through 54, 58, and 60 was used, and when a voltage between 6 kV and 9 kV was applied, even the cigarette odor was not detectable in the air at the output of the filtering apparatus.

The significance of these findings is that in the absence of an electrostatic voltage, the filter material 24 with a porosity of 32 microns allows almost all particles smaller than 32 microns to pass through the filter material 24. Example III shows that, although the porosity of the air filter material is approximately 32 microns in size, when specific conditions of this invention are met; namely:

(1) when the effective output surface area of the filter material placed between the two electrodes is large enough to slow down the air velocity per unit area to a velocity significantly slower than 0.1 m/sec, and (2) when the voltage on the filter material for enhancing the interactive effect of the Van der Waals force on the particles with fiber surfaces is 3 kV to 9 kV, then practically all particles ranging in size 1 micron down to 0.01 micron are captured.

Another significance of the findings is that the filter actually absorbed the odor of cigarette smoke, which is composed of both particles and molecules (gas) ranging in sizes of 0.005 micron to 1 micron. The sample output air (containing quite recognizable cigarette smoke odor) from the filter 54 (when electrically activated by the above-described means) showed hardly a noticeable odor of cigarette smoke. This absence of odor indicated that not only all particles were essentially trapped within the filter, but also the electric field applied between the electrodes sandwiching the filter material contained the odor between the electrodes and did not release the odor so long as the electric field was continuously applied.

EXAMPLE IV

Filter materials with a natural electrostatic charge, such as 3M's FILTRETE ® or Toray's TORI-MICRON® (Japan), have been introduced into the marketplace for a wide range of applications.

An experiment was conducted on the original invention with such a naturally electrostatic material. The following conditions existed. Filter material 24 in the configuration shown in FIG. 1 was tested with and without a 7 kV DC voltage across the electrodes 18, 20. The surface air velocity at the material 24 was 0.01 m/sec. The contaminant used was cigarette smoke. The filter material 24 was rated to capture 65% of 0.3 micron particles at 0.016 m/sec air velocity. The experiment showed a better than 1,000% improvement in the filtration by having the 7 kV potential on the electrodes, as compared to the filtration obtained with no voltage. There was no notable change by reversing the polarity on the electrodes. At a higher air velocity, 1.10 m/sec., there was still a noticeable difference and improvement in the filtration by applying the 7 kV voltage, but the filtration efficiency was greatly reduced.

EXAMPLE V

A 99.9% grade HEPA filter material was tested in a configuration equivalent to that shown in FIGS. 1 through 3. Particulates utilized for the air flow were commonly used dioctyl phthalate (DOP) sample contaminants. First, the efficiency of HEPA filter material for 0.065 to 0.3 micron particles was measured with and without the influence of a 6 kV electric field potential at 0.1 m/second surface air velocity. Using those measurement points, the efficiency of the HEPA filter material at 0.01 micron particle size was predicted by a computer extrapolation. The addition of the 6 kV potential resulted in an efficiency increase in the HEPA by one order of magnitude (about 1,000%). Thus, it appears that fiberglass HEPA filter material can also be improved with the method of the present invention by utilizing a combination of the Van der Waals force and particle entrapment between electrodes at a potential of 3,000 V–9,000 V and designing the filter surface to be such that the air velocity per unit area of the material is sufficiently lower than 0.1 m/sec.

Using the latest invention, the structure shown in FIG. 1 was converted into FIG. 1-a by adding the third electrode 202 (floating electrode). The same HEPA materials 24, voltage, and particles were used. The result of the experiment concludes at least a 300–400% further improvement in particle-capturing capability over the result of the original invention.

EXAMPLE VI

In this experiment, sixteen layers of cotton sheets (with a total thickness of 2 cm) were placed between the electrodes 18, 20 in the configuration shown in FIG. 1. The air velocity was about 0.03 meters/sec. The particles introduced were from cigarette smoke (particle sizes ranged from 0.01 micron to 1.0 micron). The average cotton pore size was estimated to be about 100 microns. The experiment was performed twice. The first time a voltage of 7 kV was applied across the electrodes with the upstream electrode 18 being positive with respect to the electrode 20. The second time, no voltage was applied. In each instance, after consecutively burning two cigarettes, the cotton layers were separated and examined. Without a potential, a light stain was observed throughout the filter material 24 indicating that the smoke particles passed through the filter but deposited some particles in the filter material during their passage. With a voltage applied, the particles were completely absorbed in the first four layers, with the first layer having the greatest amount of brown stain. The coloring diminished rapidly in the second and third layers, and there was only faint discoloration in the fourth layer.

Another experiment was performed with three layers of a low grade (10% rated) filter material (a total thickness of 3 mm). DOP particle samples were used. The air velocity was 0.1 m/sec. The filter showed 40% capturing efficiency at 0.3 micron particle size without the electric field. With an electric field applied, the capturing efficiency went up to 70% at 6 kV, 93% at 8 kV, and 98.6% at 10 kV.

These experiments of Example VI show the following:

(1) Increasing the thickness of the filter material 24 substantially improves the effectiveness of filtration and particle-holding capacity of the filter under a non-ionizing electrostatic field when the attraction of the Van der Waals force between the particles and the filter material (fibers) is electrically enhanced. The particle-holding capacity of the filter increased because the filter now collects particles in volumetric space rather than on the surface only, as observed in all mechanical particle-blocking filters (including all conventional filters such as paper, HEPA, ULPA, etc.). In the present invention, the pore size is far larger than the particle size of interest. One can use thicker filter material without creating larger differential pressure across the filter.

(2) The coarseness (porosity of the filter material 24 can be changed layer-by-layer (or continuously) to fill the filter material with particles throughout the material thickness by adjusting the porosities. For example, starting with a larger porosity material and gradually progressing to a smaller pore size material helps ensure that the particles are evenly captured and distributed throughout the entire thickness of the material, resulting in a large particle-holding capacity.

EXAMPLE VII

A set of experiments was conducted using a system basically represented in FIG. 1. The filter material 24 was placed between the two electrodes 18, 20. A potential of 10 kV was applied to the electrodes 18, 20. A 50% grade filter material was used. The measured capturing efficiency of 56% at 0 V increased to 80% at 10 kV when the downstream electrode 20 was negative, and increased to 98% when the downstream electrode 20 was positive.

All conditions being the same, a 10% grade filter material 24 was used. The results showed that the 20% measured capturing efficiency at 0 V was increased to 40%, when the downstream electrode 20 was negative, and increased to 90% when the downstream electrode 20 was positive.

Example VII showed that by the inventive technique, a low grade filter material (i.e., material of larger porosity such as cellulose) can achieve almost the same capturing efficiency as a higher grade expensive material (e.g. HEPA material). Larger porosity filter materials provide a lower air pressure drop across the surfaces. With a given pressure drop across the filter, a much thicker lower grade material can therefore be adopted, providing better filtration, as the probability of particle impact or contact with the filter fibers increases as the thickness of the filter material increases.

Example VII also showed that, as the electrode potential is raised beyond 9 kV, the polarity of the electrode potential becomes increasingly significant, possibly because of incipient ionization effects.

The above findings play a major role in the new invention, in that the addition of the third electrode 202 results in further enhancement of filtration.

EXAMPLE VIII

With the air filter 54 of FIG. 4 being in the general configuration shown in FIG. 1, experiments were performed by having the filter material 24 make contact with the downstream electrode 20 rather than having the filter material 24 suspended in the space between the electrode 18 and 20. A dramatic improvement in filtration occurred.

The filter material used was a 1.2 mm thick HEPA material rated at 50–60 micron porosity and the effective size was 13.3 cm×20.3 cm. The voltage applied was 7 kV. The particles from the cigarette smoke were 0.01 to 1 micron in size. After passing through the filter assembly 54, the uncaptured smoke particles were collected on the membrane 58 and observed by discoloration.

At an air flow rate of about 0.026 m/sec through the filter material 24, two experiments were performed. In the first experiment, a space was left between the filter material 24 and electrode 20; the membrane 58 was completely dark brown. In the second experiment, the filter material 24 was allowed to contact electrode 20; the membrane 58 was almost completely its original white color, demonstrating that the efficiency of the filter 54 was greatly increased by capturing almost all particles and passing practically no particles onto the membrane 58.

The flow rate was increased tenfold and the experiments were repeated. There was still a significant difference between the two experimental results (with or without space between the filter material 24 and electrode 20), although the efficiency of filter 54 was substantially reduced by increasing air speed. The polarity between the electrodes 18 and 20 was then reversed. With either polarity, the same results were observed. However, making the downstream electrode 20 positive increased the filter effectiveness slightly.

Similar results were obtained by causing the filter material 24 to contact the upstream electrode 18. Similar results were also obtained by placing the filter material in the front of the upstream electrode.

Another significant effect was observed. In the previous examples, when the high DC voltage (3 kV to 10 kV) was applied between the electrodes 18 and 20, there was some current flowing in the range of 20 microamps to 50 microamps, consuming electric power in the range of 0.06 watts to 0.5 watts. When a gap between one of the electrodes to the filter material was provided, the current was substantially reduced, resulting in minute power consumption. This brings practical uses of the invention into portable applications when the electrical power is at premium; e.g. personal protective masks and apparatus.

The above findings play a major role in the new invention, in that the addition of the third electrode 202 results in further enhancement of filtration.

EXAMPLE IX

Another experiment was performed using a system essentially like that of FIG. 4, but using the three electrode cylindrical filter structure shown in FIG. 9b for both filters 52 and 54. (The structure of FIG. 9b uses three electrodes 143, 144, 145 and two layers 141, 142 of filter material, the material 141 being substantially finer than the material 142.) The potential applied to filter 54 (between electrodes 144 and 145) was 8 kV. The induced voltage on the third electrode 143 was about 6 kV. Air with contaminants was drawn through the coarse filter material 142, electrically floating electrode 143, air space 140, electrode 144, 30-micron porosity paper filter material 141, electrode 145, then to the exhaust 151.

The surface velocity was about 0.1 m/sec. A handful of chopped garlic was heated and burned as the odor and particle source. The output from the filter 52 was intolerable to breathe; on the other hand, the output from the filter 54 unexpectedly contained almost no odor, indicating that the improved invention far superseded the original invention. This result was unexpected because the main filter used was the least expensive paper filter commonly used for automobile engines, yet functioned better than HEPA filter materials (which typically eliminates 0.2 micron and larger) and even eliminated odor-generating substances in the size range of 0.005 micron to 1 micron.

Knowing the size distributions of fumes, odor, smoke, and DOP particulates, it was concluded that the experimental structure is also adequate for filtering out known bacteria (ranging 0.3–40 microns in size) and viruses (ranging 0.003–0.06 microns in size) from gaseous fluids.

Importantly, when the air flow was stopped, if the electric field was not released, no odor was released from the filter; that is, the odorous substance, or particles, was captured and held. When the electric field was released, the accumulated substance began to propagate the odor into the environment through the outlet.

There are very few methods to filter out odor; the most common method is to use an activated charcoal filter. However, after a while the collected odorous substance is re-emitted into the output (environment) causing an annoying odor. For instance, laser surgery of internal organs generates very a strong unpleasant odor for the medical personnel. The conventional air filter is a combination of a HEPA filter and activated charcoal. This combination can filter out the generated particles and odor but at a high cost of materials and energy, as well as create an annoying loud noise from the powerful fan that is needed. With the present invention, a coarse and less expensive filter material is used, and an easy air flow can be established with a smaller, quieter fan. Particles and odor are efficiently trapped and contained within the filter itself by not releasing the electrical potential. Expensive and high-maintenance costs of replacing charcoal frequently are eliminated.

The same experiment was also performed with onion, soy sauce, and food burning in oil for elimination of smoke and odor and utilizing activated charcoal as hereinbefore discussed. Similar excellent results were obtained in minimizing smoke and odor.

EXAMPLE X

Figure 5:
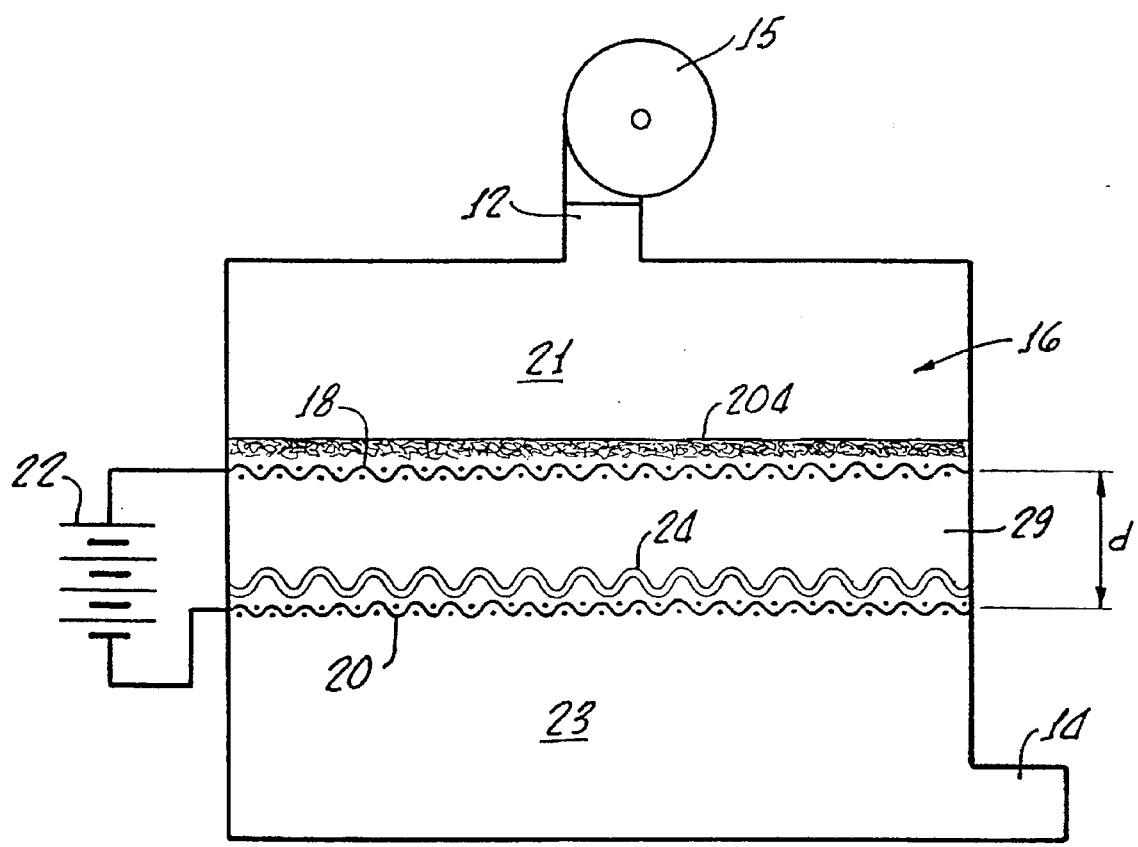
FIG. 5 is a vertical section of an alternative embodiment of the invention.

In lieu of a conductive filtering material (or filtering material treated or coated with conductive substance) in FIG. 5, a special filter material with sub-micron diameter metallic wires mixed in was used. The wires are chopped and mixed with paper filter material. This filter material with chopped microscopic metal pieces was placed as shown in FIG. 5a. The surface air velocity was 0.03 m/sec. The metallic pieces in the filter material were not directly in contact with the electrode 20. However, the induced electric field around each metallic piece (having very sharp end points which concentrate electrons resulting in very high electric field intensity around them), significantly enhanced the interaction between the filter material and the Van der Waals force on the particles. This results in an excellent filtration in comparison with the same filter material without electric potential. This structure of the filter material also minimized needed potential (even below 2,000 V) for creating the required electric field for the subject filtration technique which relies on the Van der Waals force.

The principles of the present invention can, of course, be carried out in a variety of configurations, including various combinations of electrodes, potentials, and location of filter materials.

Turning now to FIG. 7, there is shown an alternative filter apparatus or assembly 100 in accordance with the present invention which generally includes a first electrode 101, a second electrode 102, and a third electrode 103 disposed in a generally planar relationship with one another. Alternatively, the configuration may be in the form of a concentric cylinder (as shown in FIGS. 9a and 9b) or similar structure whereby the relationship of the electrodes is maintained as "parallel".

All of the electrodes 101, 102, 103 have a mesh-type form which allows air/fluid to pass therethrough. As shown, between the first and second electrodes 101 and 102, a filter material 104 is disposed, which has a much larger surface area than the cross-sectional area of the intake 106 or 107. The preferred form of the filter material 104 is pleated.

In addition, a second filter material 109 is disposed adjacent the third electrode 103. This filter may be in convoluted form, and importantly, since the electrode 103 is electrically "floating", moisture or other particle-trapping liquids may be impregnated therein to enhance filter efficiency. In accordance with the present invention, this may be done due to the fact that there is no direct electrical connection between the third electrode 103 and the charged electrodes 101, 102.

The combination of the third electrode 103 and the second filter material 109 can be implemented by some other means, e.g. using a conductive second filter material to eliminate the need for the metallic third electrode 103.

The high voltage source 118 is connected between electrodes 101 and 102 through terminals 114 and 115 in order to provide a voltage potential thereacross.

Importantly, no electrical connection is made to the third electrode 103; however, in accordance with the electrical principle hereinabove set forth in the Summary of the Invention, the third electrode 103 is electrified by induction. In this regard care must be taken to properly isolate the electrodes from one another through the use of a nonconducting support so that proper voltage induction can occur.

It has been found that such a voltage-induced electrode significantly enhances the filter capability of the apparatus.

In diagrammatic form, FIG. 7 shows the filter assembly 100 as it may be enclosed in a housing 105 which enables air, with particles suspended therein, to enter through the intake 106. Passing through the chamber 107, the air/fluid enters into the pre-filter material 109 and thereafter passes through the third electrode 103, the second electrode 102, the filter material 104, and the first electrode 101. Thereafter the filtered air passes through an exit 111.

Importantly, the floating third electrode 103 receives induced electrical potential from the electrodes 101, 102. In turn, electrode 103 electrically influences the filter material 109 in such a way that interaction between the particulates in air/fluid and the filter material 109 is enhanced.

The invented air filter apparatus consists of the combination of the electrodes 101 and 102 (electrically activated between 3,000 to 10,000 volts and having the filter material 104 between) with another electrode 103 (electrically floating without directly connected to a power source but having an induced voltage) with the coarse filter material placed thereon. This combination, arranged in a proper spacial relationship, synergistically produces very high overall efficiency in air filtration.

The unexpected enhancement of filter efficiency through the use of the third electrode with induced voltage is demonstrated hereinafter. It will be shown that a significant overall filtration improvement when the third electrode 103 with the coarse filter material 109 is electrically floating with an induced voltage.

It is found that enhanced filter efficiency for the trapping of particles occurs when the induced voltage of the third electrode 103 is about 60 to 90 percent of the voltage applied across the electrodes 101, 102.

In this regard, the spacing of the electrodes from one another, the selection of the insulation material, and configuration of the electrodes' edges are critical.

As hereinabove noted, the relative spacing between the electrodes 101, 102, 103 is important in inducing proper voltage in the third electrode 103. A specific arrangement includes first, second and third electrodes having dimensions of about 5 inches by 10 inches with a one-half inch spacing between the first and second electrodes (101 and 102) between the second and third electrodes (102 and 103). In this instance, the electrode 102, having a voltage of about 10,000 volts thereacross will cause an induced voltage of about 6,500 to 7,500 volts in the floating electrode 103.

EXAMPLE XI

The purpose of this experiment was to compare the results of the three filtration methods; namely, (1) filter all by itself, (2) the same filter in which the interaction between the Van der Waals force upon airborne particles and filter material (fiber) surfaces was enhanced with a churning motion under non-ionization conditions, as described previously, and (3) the same filter with a third electrode (which is electrically floating) with a coarse filter material added. In each instance, unexpected synergistic effects were observed. The results are summarized in FIG. 11.

Figure 11:
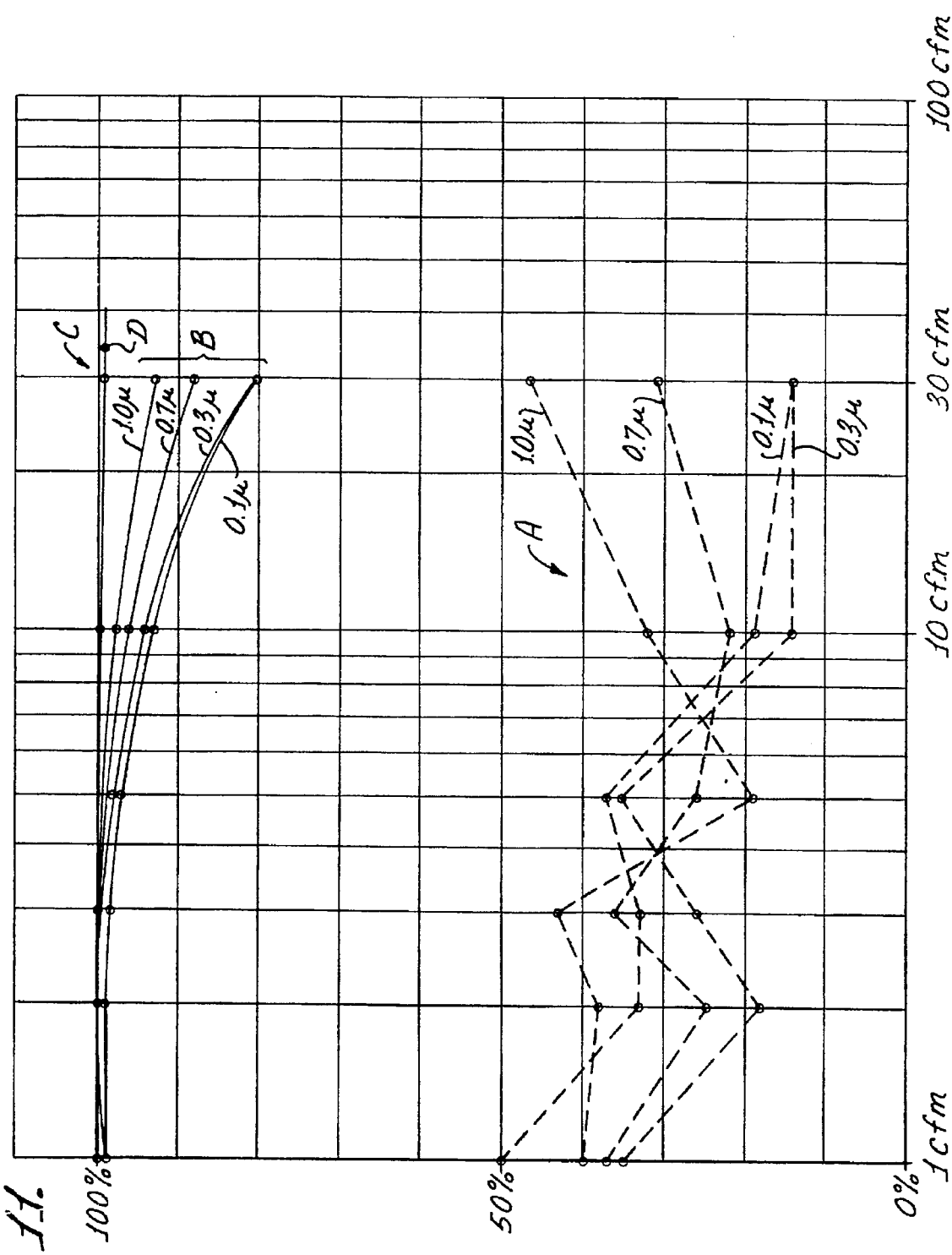
FIG. 11 is an experimental data graph showing improvements in filtration efficiency by the invention described in U.S. Pat. No. 5,368,635 and further dramatic improvements by the present invention.

FIG. 11 shows the flow rate vs. capturing efficiency using an ordinary 32-micron average porosity paper filter material. The irregular bottom group of lines, A, indicate the efficiency of the filter material by itself (estimated to be in the range of 25–30% efficiency). The second group of lines, B, indicates the result of the previous invention for the same filter dimensions, test parameters, and material. It shows improved very high efficiency of almost 100% at a low cfm (cubic feet per minute) rate (5 cfm), then a gradual decrease in efficiency as the air volume increases. Such decrease in efficiency is shown separately depending on the particle sizes, which range from 0.1 to 2.0 microns.

Thirdly, under the same conditions (with the same materials, same size particles, same configurations, same non-ionizing voltage, etc.), the present invention (with an added third electrode), shown by the group of line, C, far supersedes the efficiency of the previous invention by maintaining high efficiency (virtually 100%) all the way to an air volume of 32 cfm (which was the maximum air volume the given test setup could generate), as indicated by arrow D in FIG. 11. It is important to note that particle sizes ranging from 0.1 to 2 microns (and later with particles of 0.01 to 1 micron from cigarette smoke) were virtually 100% captured through the filter material with a 32 micron average porosity.

Further improvements as a filter may be made when a composite filter material 109 is used in combination with the third electrode 103. For instance, the filter material 109, as hereinabove noted, may be moisturized with a low-evaporating type substance or otherwise chemically treated to enhance the entrapment of particles (e.g. hazardous gas molecules). The filter material 109 (or the filter material 104 between the first and second electrodes) may also be impregnated with an agent which absorbs, reacts, or kills the microorganisms, bacteria, hazardous chemicals, etc. Such filter materials contemplated for use include, but are not limited to, carbon-impregnated synthetic foam and foam filter material impregnated with receptors of undesirable gaseous molecules.

EXAMPLE XII

A set of experiments was conducted for the purpose of comparing the effect of the invention in using (1) a commercially available, common grade (with an average 40 micron porosity), and inexpensive (about $1 per pound) paper filter material, and (2) precharged synthetic filter material considered to be the forerunner in the automobile cabin air purifier today (the material cost of about $40 per pound).

Both filter materials were housed in two filters with identical configurations shown in 129 of FIG. 8 (and also in FIG. 9a) and tested in the test chamber shown in 126 of FIG. 8 under the same conditions. Air with airborne particles enters into the space 121 through inlet 120; goes through the first filter 122, the third electrode 123, air space between the electrodes 123 and 124, then through 124, the second filter material 131, and finally the first electrode 125. The air is sucked out by the fan 127, through the opening 128 to the open air. The results of the experiments were shown in FIG. 12 and 13.

Figure 12:
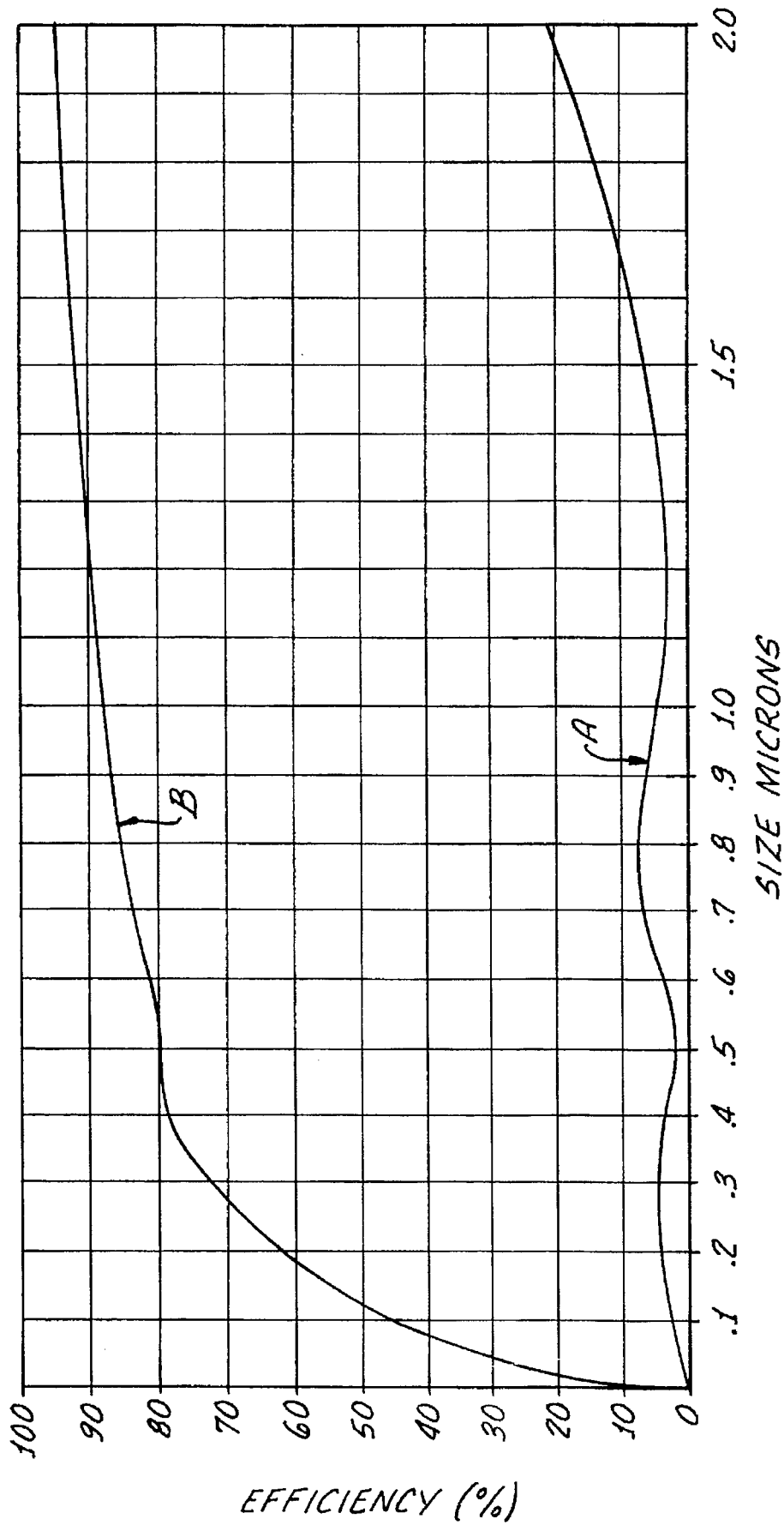
FIG. 12 is an experimental data graph showing improvement in filtration obtainable with the present invention.

In FIG. 12, the bottom (curve) line A shows the efficiency of the material (1), which exhibits very low efficiency of mostly less than 10%. When the Van der Waals force interacting with surfaces of filter fibers was enhance by applying the electric potential (about 9 kV, and the current of 35 microamperes, with induced voltage of about 4.2 kV), it produced the result shown on the top (curve) line B.

Figure 13:
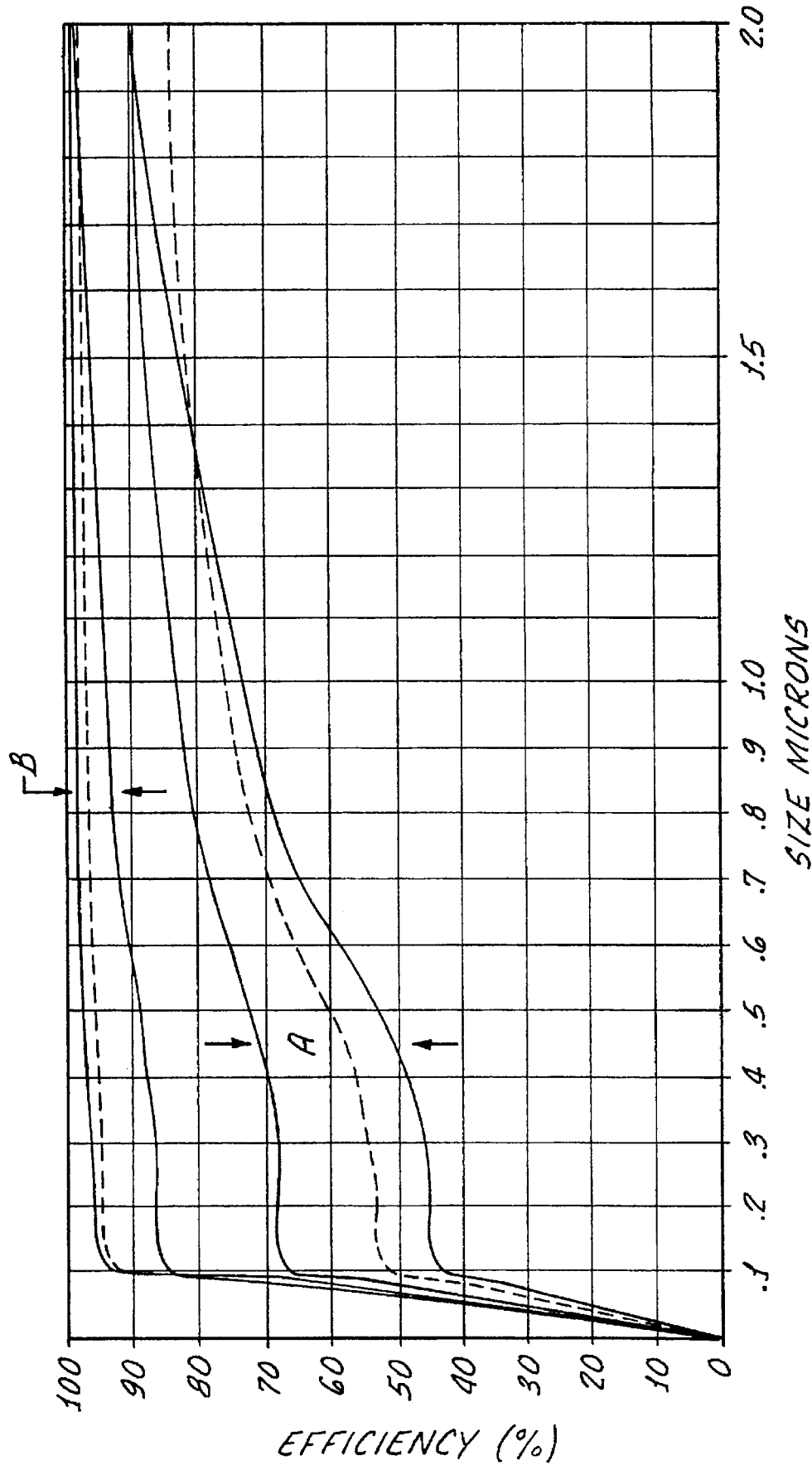
FIG. 13 is yet another experimental data graph showing improvement in filtration obtainable with the present invention.

In FIG. 13, the first set of 3 lower (curve) lines, A, is the efficiencies of the material (2) at three different air volumes: 10 cfm on the top, 30 cfm in the middle (dot line), and 70 cfm at the bottom. Again, when the Van der Waals force interacting with surfaces of filter fibers was enhanced by applying the electric potential (under the same conditions described above), it produced the results shown by the second set of three curves, B, on the top; the top curve in the first set corresponds with the top curve in the second set, etc.

It is interesting to note that under the invented method of enhancement, the efficiency of the very low cost filter material can easily surpass the capability of the most expensive precharged filter material. Of course when the precharged material is enhanced by the method, it provides a substantial improvement in performance.

Another example of results showing the effect of the current invention appears in Table I. A cylindrical filter constructed in the configuration shown in FIG. 9b is tested in the test chamber shown in FIG. 4 without the path of 52 and 56, using ambient air as the source of sample air without adding cigarette smoke. The filter material used was inexpensive ordinary grade paper filter (commonly used in automobile engine air filters) with 30 micron average porosity. The results were unexpectedly remarkable; the paper filter produced the efficiency that is equivalent to the most popular grade and expensive HEPA filter. In addition, it further shows high efficiency of capturing submicron particles of 0.1 micron. HEPA filters for submicron particles (below 0.2 microns) are not economically practical because of the high energy consumption needed to force air through the filter.

TABLE I

EXPERIMENTS CONDUCTED WITH AND WITHOUT
ENHANCING THE VAN DER WAALS FORCE
Quality of incoming air
(Temp. 76° F., Humidity 70%) to the filter shown in FIG. 1a.

| Particle Size (Microns) | Number Particles |
|---|---|
| .1 | $1.8e^{+06}$ |
| .2 | $7.7e^{+05}$ |
| .3 | $3.2e^{+05}$ |
| .4 | 92969.0 |
| .5 | 18183.0 |
| .7 | 5000.0 |
| 1.0 | 2146.0 |
| 2.0 | 454.0 |

Quality of out-going air
from the filter shown in
FIG. 1a, 30 micron porosity,
pressure drop 0.04" $H_2O$

| Particle Size (Microns) | Number of Particles | % Removed |
|---|---|---|
| .1 | 8749.0 | 99.5% |
| .2 | 3934.0 | |
| .3 | 1745.0 | 99.45% |
| .4 | 526.0 | |
| .5 | 86.0 | 99.53% |
| .7 | 21.0 | |
| 1.0 | 5.0 | 99.77% |
| 2.0 | 3.0 | |

The recent interest in air filtration and purification lies in the area of eliminating odors and micro-organisms (such as viruses), which are far below 0.2 microns in size, by economical and affordable means. In a collaborating research of exploring the capability of the invention, the Harvard School of Public Health verified that an apparatus built in accordance with this invented concept successfully and efficiently captured 0.05 micron particles, which simulated airborne viruses.

In summary, particulates carried in air/fluid are filter out in the following way:

(1) First, larger particles are trapped within the filter material 109 under the influence of induced electrical potential on the electrode 103 which creates a perpendicular motion of the particles inside of the filter material 109.

(2) Next, the air velocity per unit area in the filter material 104 is substantially reduced because the area of the pleated filter material is larger than the cross-sectional area of the air path.

(3) Thus, the effective particle velocity traveling across the filter is reduced, and the resident time of the particles in the filter materials is increased because of the churning motion described previously under the influence of the electrostatic fields among the electrodes 101, 102 and 103.

Because of the transverse motion of the particles carried in air/fluid due to the electrostatic fields, the porosity of the filter materials can be very large in comparison with the sizes of particles to be filtered out.

FIG. 8 shows another arrangement of the filter utilizing floating electrode(s). In this illustration, a cylindrical filter 129 is constructed of three layers of electrodes 123, 124 and 125. The filter is placed in housing 130. The pre-filter material 122 is placed on the electrode 123. The filter materials 122 and 131 collect large and small size particles, as well as both can provide added functions such as absorption of odor, virus, micro-organisms, and gas molecules as mentioned.

Air/fluid, carrying particulates, is induced into the chamber 121 through the intake 120. That air/fluid goes through the pre-filter material 122, mesh-like electrodes 123,124 and the filter material 131 and the electrode 125 into the final chamber 126 and then to the exhaust 128. The fan 127 is to create the air flow through the filter can be placed in the intake side 120 as well.

The electrical potential on the electrode 123 is floating (not directly connected to any power source), and a pre-filter 122 is placed on the electrode 123. Potential is applied between electrodes 124, 125, which sandwich the filter material 131. The filter material 131 has a much larger surface area than that of the electrodes 123, 124, 125. The electrodes 123, 124, 125 are essentially spaced evenly from and parallel to one another.

The air/fluid, carrying particles, enters into the chamber 121 through the intake 120. The floating electrode 123 holds an electrical potential under the influence of the electric potential on the electrode 124 thereby electrifying the filter material 122, as well as creating the transverse motion of particles within the air/fluid, causing the larger particulates to be efficiently trapped within the filter material 122. Then air/fluid proceeds through the electrode 123, the space between the electrodes 123 and 124, the electrode 124, the pleated filter material 131, then finally the electrode 125.

Effective air velocity per unit area on the pleated filter material 131 is reduced because of the larger surface area. Additionally, the effective velocity of the particulates in air/fluid is further slowed due to the churning motion created by electrostatic field between the electrodes 124, 125, causing the particulates to interact with and adhere to the filter material 131. The most convenient form for filter material 131 and filter material 122 is pleats. It should be appreciated that with a proper design, the filter materials 122, 131 (FIG. 8) and 104, 109 (FIG. 7) may be independently replaceable without discarding the entire filter assembly, including electrodes in order to provide low-cost maintenance economy.

FIG. 9a shows the parallel and evenly spaced relationship of filter materials 131, 122 and electrodes 123, 124, 125. Of course, the flow of air/fluid can be reversed, and the electrodes and filter materials constructing the filter can be rearranged in such a way that the air/fluid enters from the outer electrodes and exits from the inner chamber as shown in FIG. 9b.

Although FIG. 7 shows a particular arrangement of electrodes in relationship to the electrical potentials (e.g. the plus side of the power source is connected to the electrode 102), the arrangement of electrical potentials can be reversed or rearranged. Another arrangement can be made that, without the electrode 103, the filter material 109 can be placed on the in-flow side of the electrode 102, which is charged with "plus." Or, the electrode 103 and the filter material 109 can be integrated into one structure whereby the filter material 109 consists of a conductive material.

The pre-filter 109 may consist of materials such as carbon-impregnated foam which increase the effectiveness of odor reduction. Further, the filter materials 109, 104 may be selected or treated to minimize the passage of certain microscopic organisms (e.g., bacteria) or chemical substances in air/fluid.

The most preferred embodiment for highly efficient filtration is the structure first described whereby the electrode 103 in FIG. 7 is electrically floating, and the potential is applied across electrodes 101, 102 where electrode 102 is positive and electrode 101 is grounded. The distance between the electrodes 101, 102 can be 5 mm to 50 mm. However, the best distance between them is about 12 to 15 mm, with the potential applied to be about 10,000 V. The spacing between electrodes 102, 103 can also be between 5 mm to 50 mm; again, however, the best distance between them is about 12 to 15 mm. In this case, observed induced voltage on electrode 103 due to electrode 102 is about 6,000 V to 9,000 V.

The aforementioned planar structure shown in FIG. 7, whereby the electrode 102, carrying a high voltage (10,000 V.) is situated between the grounded electrode 101 and the floating electrode 103, potentially isolates the high voltage electrode. The cylindrical structure described in FIG. 8 provides further safety from electrical shock by having the grounded electrode 101 to surround the other electrodes. A similar configuration for safety can be devised when the relationships of the electrical potentials on electrodes are changed.

Although there has been hereinabove described a filter for particulate materials in gaseous fluids in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. Filter apparatus for trapping particles suspended in a gaseous fluid stream, said filter apparatus comprising:

a) filter chamber means for defining an air flow path between an inlet and an outlet;

b) a porous filter positioned in said flow path, said porous filter comprising a material having a pore size substantially larger than the average diameter of the particles to be trapped, said filter having a collection surface thereon substantially larger than a cross-section of the flow path;

c) impelling means for causing said gaseous fluid stream and particles suspended therein to flow along said flow path and through said porous filter; and d) first and second electrodes disposed with the porous filter therebetween and having means defining openings therein for enabling air flow therethrough;

e) means for applying a selected DC voltage across the first and second electrodes; and f) a third electrode having means defining openings therein for enabling air flow therethrough; and g) means for positioning and supporting said third electrode proximate said first and second electrodes in order to electrify, by induction, the third electrode with a voltage in said third electrode and increase trapping of the particles by the filter apparatus.

2. The filter apparatus according to claim 1 wherein the electrodes are arranged in order to induce the third electrode with a voltage of at least 40 percent of the voltage applied across the first and second electrodes.

3. The filter apparatus according to claim 1, wherein the electrodes are arranged in order to induce the third electrode with a voltage of between about 60 percent, and about 70 percent of the voltage applied across the first and second electrodes.

4. The filter apparatus according to claim 1 wherein the first, second and third electrodes are coaxially disposed.

5. The filter apparatus according to claim 4 wherein the third electrode is disposed outwardly from the first and second electrodes.

6. The filter apparatus according to claim 5 further comprising a second porous filter disposed adjacent to and coaxially with the third electrode.

7. The filter apparatus according to claim 1 wherein said first and second electrodes are spaced apart from one another a distance of between about 5 mm and about 50 mm and between about 3000 volts and about 10,00 volts are applied across the first and second electrodes.

8. The filter apparatus according to claim 7 wherein said third electrode is disposed about 13 mm from the second electrode.

9. The filter apparatus according to claim 1 wherein the porous filter has varying porosity with an increasing pore size along the air flow path.

10. Filter apparatus for trapping particles suspended in a gaseous fluid stream, said filter apparatus comprising:

a) filter chamber means for defining an air flow path between an inlet and an outlet;

b) a porous filter positioned in said flow path, said porous filter comprising a material having a pore size substantially larger than the average diameter of the particles to be trapped, said filter having a collection surface thereon substantially larger than a cross-section of the flow path;

c) impelling means for causing said gaseous fluid stream and particles suspended therein to flow along said flow path and through said porous filter;

d) first and second electrodes disposed with the porous filter therebetween and having means defining openings therein for enabling air flow therethrough;

e) means for applying a selected DC voltage across the first and second electrodes; and f) a third electrode having means defining openings therein for enabling air flow therethrough; and g) means for positioning and supporting said third electrode proximate said first, second and one another in order to electrify, by induction, the third electrode with a voltage in said third electrode and increase trapping of the particles by the filter apparatus.

11. The filter apparatus according to claim 10, wherein the electrodes are arranged in order to induce the third electrode with a voltage of between about 60 percent and about 70 percent of the voltage applied across the first and second electrodes.

12. The filter apparatus according to claim 10 wherein the first, second and third electrodes age coaxially disposed.

13. The filter apparatus according to claim 12 wherein the third electrode is disposed outwardly from the first and second electrodes.

14. The filter apparatus according to claim 13 further comprising a second porous filter disposed adjacent to and coaxially with the third electrode.

15. The filter apparatus according to claim 10 wherein said first and second electrodes are spaced apart from one another a distance of between about 5 mm and about 50 mm and between about 3,000 volts and about 10,000 volts are applied across the first and second electrodes.

16. The filter apparatus according to claim 15 wherein said third electrode is disposed about 13 mm from the second electrode.

17. The filter apparatus according to claim 10 wherein the porous filter has varying porosity with a increasing pore size along the air flow path.

18. A method for trapping particles suspended in a gaseous fluid stream, said method comprising the steps of:

establishing a flow of a gaseous fluid with particles suspended therein;

passing the flow of gaseous fluid through a first, second and third electrode and a porous filter disposed between the first and second electrodes;

applying a voltage across the first and second electrodes in order to cause churning of the particles within the porous filter and trapping of the particles as the gaseous fluid passes through the porous filter; and arranging the first, second and third electrodes in order to electrify, by induction, the third electrode with a voltage and increase the trapping of particles.

19. The method according to claim 18 wherein the step of arranging the electrodes causes an induced voltage in the third electrode of at least 40 percent of the voltage applied across the first and second electrodes.

* * * * *